Feb. 15, 1944. F. W. SCHWINN 2,341,821
HANDLEBAR CUSHION STRUCTURE
Filed Jan. 5, 1942
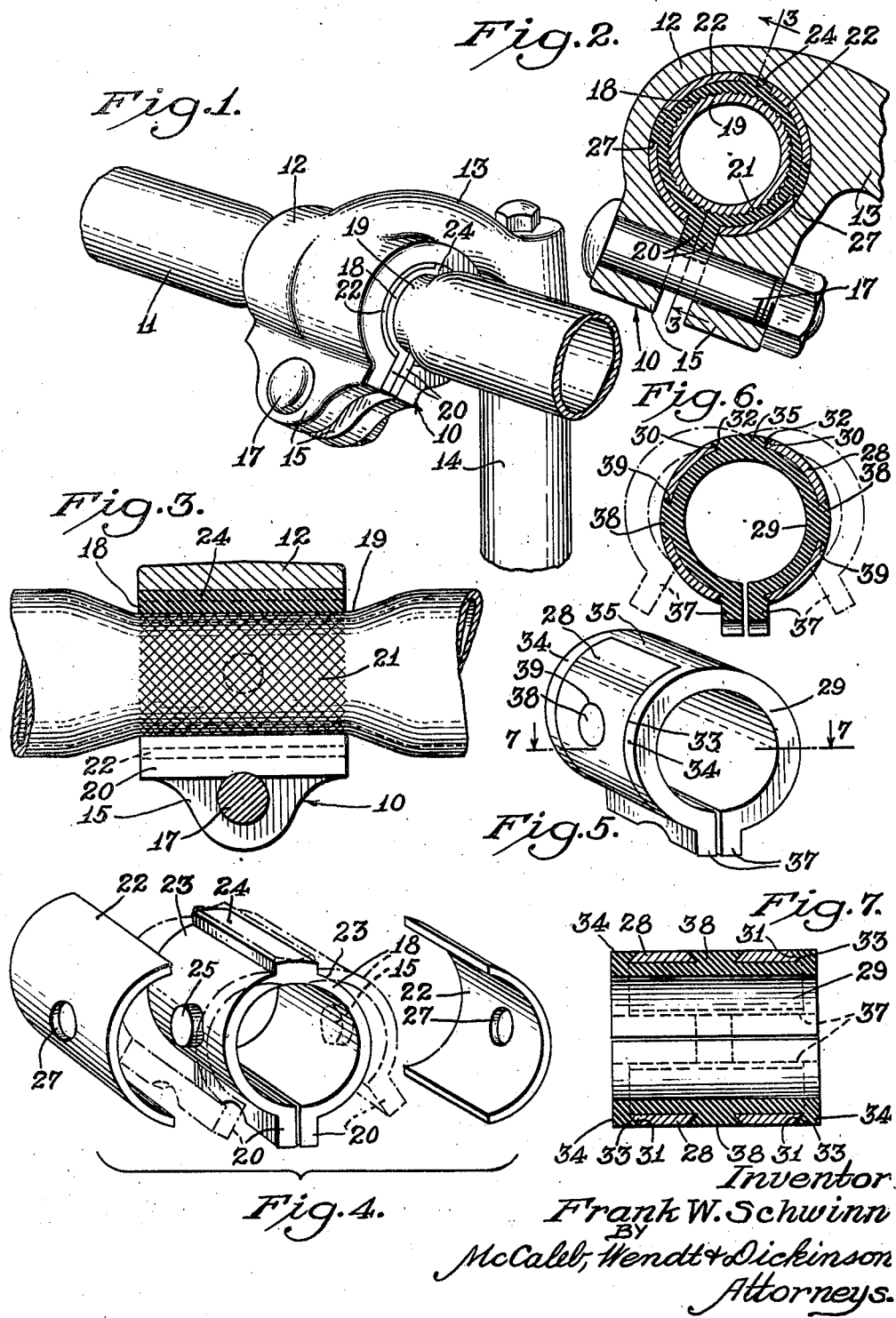
Inventor
Frank W. Schwinn
BY McCaleb, Wendt & Dickinson
Attorneys.

Patented Feb. 15, 1944

2,341,821

UNITED STATES PATENT OFFICE 2,341,821

HANDLE-BAR CUSHION STRUCTURE

Frank W. Schwinn, Chicago, Ill.

Application January 5, 1942, Serial No. 425,601

10 Claims. (Cl. 287—85)

This invention relates to improvements in handlebar cushions, and more particularly concerns a bicycle handlebar structure in which a shock and vibration dampening cushion is provided between the handlebar and the clamping eye by which the handlebar is engaged to the steering post of the bicycle.

Among the problems which must be overcome in producing a commercially satisfactory handlebar cushion structure, probably the most serious is that of attaining the desired results while maintaining the handlebar and clamping eye structures as nearly as practicable within commercial standards as to size. In particular, it is highly desirable to have the cushion-equipped handlebar adapted to be received within a conventional clamping eye, thus rendering the cushioned handlebar interchangeable with conventional handlebars either in existing or new bicycles.

In addition, there is the problem of producing a cushion structure which is effective for the purpose and which can be conveniently assembled with the handlebar at a low enough cost to make it commercially attractive to supply the bicycle with this feature.

The principal aim of the present invention is to meet these problems with an efficient handlebar cushion structure which is simple in construction and easy to install.

Another object of the invention is to provide a preformed replaceable cushion structure that can be readily applied at the time the handlebar is assembled with the clamping eye. My improved cushion is thus a substantial improvement over the relatively expensive prior expedients which contemplate forming the cushion as a substantially integral part of the handlebar and require special relatively slow acting and cumbersome apparatus in manufacture. On the other hand, relatively high speed, low cost quantity production methods may be employed in manufacturing my improved cushion.

A further object is to provide a handlebar cushioning member which can be stocked by supply stores as a replacement part that is adapted for easy and quick installation by the cyclist or a repairman to replace such a member for any reason as, for example, because of deterioration of the resilient material after long use.

Another object is to provide such a replaceable handlebar cushion equipped with a readily removable surfacing shell to protect the resilient material thereof from the clamping eye of the steering post, so that in effecting replacement the protective shell can be reused with the relatively inexpensive, new resilient cushioning member.

Still another object is to provide a novel resilient handlebar cushion structure which is adapted for selective tensioning.

Other objects and advantages of the invention will be apparent from the following description and the accompanying drawing, in which similar characters of reference indicate similar parts throughout the several views.

Referring to the drawing:

Fig. 1 is a fragmentary perspective view showing the mid-portion of a handlebar equipped with my improved cushioning structure and assembled with a standard clamping eye;

Fig. 2 is an enlarged vertical sectional view through the assembly, taken in a transverse plane through substantially the longitudinal center of the clamping eye;

Fig. 3 is a longitudinal sectional view taken substantially along line 3—3 of Fig. 2;

Fig. 4 is an exploded assembly view of the cushion structure;

Fig. 5 is a perspective view of a modified form of the cushion structure;

Fig. 6 is a transverse vertical sectional view taken in a plane substantially through the longitudinal center of the modified form of cushion shown in Fig. 5; and Fig. 7 is a longitudinal sectional view taken substantially in the plane of line 7—7 of Fig. 5.

As shown by way of example in Fig. 1, a cushion structure 10 embodying the features of my invention is adapted to be used with a handlebar 11 which is held in place on the bicycle by a conventional split eye clamp 12 integral with a gooseneck extension 13 of a steering post 14.

The jaws of the clamp 12 have the usual opposed, substantially parallel tightening ears 15 which are apertured in alinement to accommodate a tightening bolt 17.

The cushion 10 is designed to lie in shock- and vibration-absorbing relation between all parts of the opposing handlebar and clamping eye surfaces, and includes as the principal element a split sleeve 18 of resilient material such as rubber which is preformed to a cylindrical shape for snugly encircling the mid-portion of the handlebar 11. In length, the sleeve 18 may be about equal to length of the eye clamp 12.

A mid-section 19 of the handlebar 11 is preferably formed of a reduced diameter, by swaging or other suitable method, sufficient to provide ample space for the thickness of the cushioning sleeve 18. Thus, the external diameter of the sleeve may be no greater than that of the conventional spacer sleeve or ferrule usually provided on the mid-section of handlebars for engagement by the clamp 12. Through this arrangement, the handlebar 11 can be partially threaded through the clamping eye 12 and the cushioning sleeve 18 assembled in centered relation upon the reduced mid-section 19, whereafter by a continued longitudinal movement of the handlebar the cushioning sleeve is carried into the clamping eye. The handlebar is then held in the preferred position of vertical adjustment and the tightening screw 17 is drawn up to secure the clamp tightly against the cushion.

Every precaution is taken to avoid contact between the handlebar 11 and the clamping eye 12 under all conditions in use, so that full benefit of the cushion is obtained constantly. To this end, the larger diameter portions of the handlebar are designed to merge with the reduced section 19 in such a manner (Fig. 3) as to assure complete freedom from contact with the ends of the clamp 12 in any compressed condition of the sleeve 18 during use of the bicycle.

As best seen in Figs. 2 and 4, the cushioning sleeve 18 is split only along one longitudinal line. Because of its flexibility, the sleeve is adapted to be spread open, as indicated in dot-dash outline in Fig. 4, so as to receive the handlebar by a diametrical assembly movement.

Convenient finger holds for spreading the sleeve open are provided by parallel, outwardly extending integral flanges 20 formed along the respective edges at the split in the sleeve. Within the clamp 12, the flanges 20 are placed between and squeezed together by the tightening ears 15 (Figs. 1 and 2) whereby to hold the cushioning sleeve 18 positively against both longitudinal and rotative movement relative to the clamp.

After the eye clamp 12 has been tightened, the handlebar 11 is held against longitudinal or rotary movement relative to the cushioning sleeve 18 by the uniform frictional grip thereon of the resilient material of the sleeve forced radially inwardly against the mid-section 19 of the handlebar by the eye of the clamp. In order to make the frictional grip more positive, the surface of the mid-section 19 may be knurled or otherwise roughened, as indicated at 21.

In operation, the cushioning sleeve 18, due to its resiliency, permits slight vertical movement of the handlebar 11 relative to the clamping eye 12 and, to a greater extent, oscillation or rocking of the handlebar about the axis of the mid-section 19. In addition, the handlebar 11 may, under the resiliency of the cushioning sleeve 18, rock about any diameter of the handlebar passing through the axis of the reduced center section 19, and to a lesser extent yield axially of the clamp 12. This effectively absorbs shock and vibration which would be transmitted to the handlebar if there were a direct engagement of the handlebar by the clamp. Thus, the riders' hands and arms are, very largely, if not altogether, saved from the fatiguing effect of road shock and vibration which would be transmitted from the bicycle to the handlebar but for the practically universal movement permitted by the cushion. It may also be noted that whenever the handlebar 11 is rocked, or moved axially, the resilient cushioning sleeve 18 functions as a torsion spring to return the handlebar to the normal adjusted position.

Another advantage of the cushion structure 10 is that the cushioning tension of the sleeve 18 may be selectively adjusted as determined by the amount of tightening of the eye clamp. This permits the attainment, within limits, of the degree of springiness in the cushion preferred by the user.

Although reasonably good results may be obtained with the cushioning sleeve 18 where the eye clamp 12 directly engages the periphery of the sleeve, more uniform distribution of the compressive force of the clamp against the sleeve is attained by at least partially encasing the sleeve in a hard surface protective shell. In the present instance, the shell comprises a split sleeve formed of a pair of identical, substantially semi-cylindrical compression plates 22. These plates may be formed from relatively thin sheet metal which is only a fraction of the thickness of the sleeve 18.

In assembly, the compression plates 22 are received flush within respective depressions 23 formed at the opposite sides in the periphery of the cushioning sleeve 18. The opposed longitudinal edges of the plates are separated at the bottom of the sleeve 18 by the finger-hold flanges 20 and diametrically opposite, at the top of the sleeve, by an integral land or rib 24, as seen in Figs. 2 and 4. By this arrangement the compression plates 22 are held in proper relation circumferentially of the cushion sleeve, and the opposed edges of the plates are held in amply spaced, permanently non-contacting relation.

Proper longitudinal positioning of the compression plates 22 on the cushioning sleeve is controlled by radially extending integral indexing bosses 25 formed at preferably diametrically opposite central points on the sleeve within the offset depressions 23. These bosses are received in centered complementary apertures 27 in the respective plates, and after assembly hold the plates positively against longitudinal displacement relative to the sleeve 18.

As the jaws of the clamp 12 are tightened against the cushion 10, the compression plates 22 distribute the jaw pressure with substantial uniformity against the areas of the cushioning sleeve 18 respectively embraced thereby. This avoids distortion of the cushion sleeve and possibly even damage thereto where the clamp eye is not entirely symmetrical or has a rough surface. Moreover, from the very nature of the clamping action of the jaws there is a certain amount of relative peripheral movement between the opposed faces of the jaws and the cushion structure which merely results in a relative sliding interengagement between the jaws and the hard, smooth surfaces of the compression plates, and thus avoids any distorting effect upon the cushioning sleeve 18 which might result, due to frictional resistance of the sleeve material, were it unsheathed.

For some purposes it may be preferred to have the compression plates and the cushioning sleeve substantially united against separation so that the combined structure can be handled as a unit. As shown in the modified form of Figs. 5, 6 and 7, this may be accomplished by forming compression plates 28 in such a manner that they may be molded and vulcanized in place flush with the periphery of a longitudinally split cushioning sleeve 29, coincident with formation of the sleeve. The edges of the compression plates 28 may be at least slightly overlapped by the resilient material of the cushioning sleeve 29 in order to anchor the plates more securely. Thus, the longitudinal edges of the compression plates 28 may be chamfered as indicated at 30 (Fig. 6), and the end edges may be chamfered as indicated at 31 (Fig. 7), so that during molding of the cushioning sleeve 29, respective integral retaining flanges 32 and 33 on the sleeve will overlap the chamfers and substantially lock the compression plates in place. It will be observed that the chamfered edges 30 and 31 of the plate and the overlapping engagement flanges 32 and 33 form what is in effect a tongue and groove arrangement.

In order to render the end retaining flanges 33 fully effective, the cushioning sleeve 29 is formed substantially longer than the compression plates 28 so that the end of the sleeve extends sufficiently beyond the compression plates to provide integral flush end ribs 34 which provide a good backing for the retaining flanges 33.

It may be pointed out that the ribs 34 also have a cushioning function adjacent the ends of the clamp in more effectively resisting the relatively concentrated compression resulting from rocking of the handlebar 11 about a diametrical axis through the clamp.

The opposed longitudinal edges of the compression plates 28 are, similarly as in the first described form of the invention, separated at the top of the cushion by a substantially flush rib 35, and at the bottom of the cushion by parallel finger hold flanges 37 which extend integrally from the cushion sleeve 29 at each side of the longitudinal split in the sleeve. Centered, integral anchoring buttons 38 may extend from the sides of the cushioning sleeve 29 into engagement with the compression plate 28 within complementary conically countersunk apertures 39.

In applying the cushioning sleeve 29 to the handlebar, the sleeve is spread apart substantially as shown in dot-dash outline in Fig. 6, the material at the longitudinal rib 35 being sufficiently elastic for this purpose. This is accomplished without any strain upon the sides of the cushioning sleeve.

It will thus be apparent that my invention provides a handlebar cushioning structure which is a substantial improvement over prior constructions in that instead of being molded in place on the handlebar, it is designed to be applied to the handlebar by hand in preformed condition prior to assembly with the clamping eye of the bicycle. As compared with prior expedients, the present handlebar cushion can be manufactured at lower cost inasmuch as it is entirely practicable to make it by high speed quantity production methods. By preforming the cushioning sleeve, better control is possible of density of the rubber from which it may be molded, resulting in improved cushioning efficiency.

While the invention is susceptible of various modifications, and alternative constructions, I have shown in the drawing, and have herein described in detail certain preferred embodiments, but it is to be understood that I do not thereby intend to limit the invention to the specific forms disclosed, but intend to cover all modifications and alternative constructions falling within the spirit and scope of the invention as expressed in the following claims.

I claim:

1. A cushioned handlebar construction comprising, in combination, a handlebar having a reduced diameter mid-section, said reduced diameter section being long enough to clear the opposite ends of a standard longitudinally split clamping eye with which the handlebar is adapted to be assembled, and a pre-formed cushioning sleeve replaceably surrounding said reduced diameter mid-section and being longitudinally split to facilitate placement and removal, said sleeve having a pair of parallel finger-hold flanges integrally formed at the respective opposite sides of the split and adapted when the handlebar is assembled with the clamping eye to be engaged within the split of the eye to hold the sleeve positively against either rotary or longitudinal movement relative to the clamping eye.

2. In combination in a handlebar or like cushion structure, a split sleeve of resilient material preformed to fit about the section of a handlebar which is to be received within the clamping eye of a steering post, and a compression plate structure preformed to fit against the resilient sleeve, and having opposed longitudinal edges spaced from the split in the sleeve, the split sleeve having integral ribs of the resilient material intervening between the opposed longitudinal edges of the compression plate structure.

3. A handlebar or like cushion comprising, in combination, a sleeve of resilient material arranged to fit about the portion of the handlebar or the like to be insulated against shock and vibration from an engaging member, and compression sheathing means carried by the periphery of the sleeve, the sleeve and the sheathing means having a tongue and groove interengagement holding the sheathing means and the sleeve together as a unit against separation.

4. A cushioning structure comprising a preformed sleeve of compressible resilient material split along a single longitudinal line so as to be capable of being spread open for application to a member to be cushioned, and a pair of compression plates formed to engage said sleeve at opposite sides of the longitudinal split and having their opposed edges remote from the split spaced apart a sufficient distance to permit unhampered bending of the sleeve intermediate such edges as an incident to spreading the sleeve open while the plates are in place on the sleeve.

5. A bicycle or like handlebar cushion comprising, in combination, an annular resilient sleeve adapted to embrace that portion of a handlebar which is to be received within the clamping eye of a bicycle steering post, the sleeve being split along a longitudinal line so that it can be spread open to receive the said handlebar portion, and a pair of curved compression plates engaging opposite sides of the sleeve, and means adjacent the split and also on that portion of the sleeve opposite the split for maintaining the opposed edges of the plates separated even when the cushion is placed under compression in the clamping eye.

6. A cushion substantially as defined in claim 5 in which the edge-separating means adjacent the split is a rib comprising a cooperative pair of finger-hold flanges formed integral with the resilient sleeve.

7. A cushion structure for bicycle or like handlebars comprising, in combination, a sleeve formed of resilient material and being of substantially the same length as the clamping eye of a bicycle steering post, protective sleeve means of relatively hard surface on the periphery of the resilient sleeve and arranged to make direct contact with the clamping eye, said protective sleeve means being shorter than the resilient sleeve, and cushioning ribs on the resilient sleeve beyond the opposite ends of the protective sleeve means.

8. A cushioning structure for bicycle or like handle bars, comprising a sleeve of resilient cushioning material preformed with an internal diameter substantially complementary to the mid-section of a handle bar so as to engage the latter snugly and provide a complete cushion between the handlebar and the clamping eye of a bicycle steering post, the sleeve being split to permit assembly thereof by a transverse movement relative to the handle bar, preformed integral means projecting from the sleeve arranged to be engaged between opposing gripping portions of the clamping eye structure to hold the sleeve against displacement relative to the clamping eye under the influence of force exerted by the handle bar during use, and preformed hard surfaced sheathing protectively embracing the major peripheral area of the resilient sleeve in interposed relation between said sleeve area and th clamping eye to receive directly the clamping pressure of the tye and protect the sleeve from distortion of relative peripheral movement of the clamping eye and the sleeve incidental to tightening of the clamping eye thereabout.

9. In combination in a handle bar or like cushion structure, a split sleeve of resilient material preformed to fit about that section of a handlebar which is to be received within the clamping eye of a bicycle steering post, and a pair of compression plates preformed to fit against the resilient sleeve, said compression plates being permanently interconnected with the sleeve and covering the major area of the sleeve opposed to the clamping eye for receiving the clamping eye directly thereagainst to prevent distortion of the sleeve by relative peripheral sliding of the clamping eye relative to the sleeve incidental to tightening of the clamping eye.

10. A bicycle handle bar cushion comprising a preformed sleeve of resilient material arranged to fit about the mid-portion of the handle bar as a shock and vibration insulating cushion and adapted to have the clamping eye of the steering post of a bicycle clamped thereabout by drawing together opposed tightening ears with which the clamping eye is provided, and a pair of curved sheath plates bearing against and covering the major areas of the opposite sides of the sleeve periphery to make direct contact with the clamping eye and protect the sleeve from distortion resulting from relative peripheral movement of the sleeve and clamping eye when the clamping eye is tightened, said sleeve being longitudinally split intermediate the opposing edges of said sheath plates and having radially projecting engagement flanges extending beyond the peripheries of the sheath plates adapted to be grasped to pull the sleeve open in mounting the same upon the handle bar and also adapted to be received between the tightening ears of the clamping eye to hold the sleeve against displacement relative to the clamping eye.

FRANK W. SCHWINN.